United States Patent
Schipper et al.

(10) Patent No.: US 11,254,034 B2
(45) Date of Patent: Feb. 22, 2022

(54) MOULD AND METHOD FOR INJECTION MOULDING A CLOSURE ASSEMBLY

(71) Applicant: Weener Plastics Group B.V., Ede (NL)

(72) Inventors: Michael Schipper, Ede (NL); Holger Pries, Ede (NL); Günter Rieken, Ede (NL)

(73) Assignee: Weener Plastics Group B.V., Ede (NL)

( * ) Notice: Subject to any disclaimer, the term of this patent is extended or adjusted under 35 U.S.C. 154(b) by 138 days.

(21) Appl. No.: 16/609,787

(22) PCT Filed: May 3, 2018

(86) PCT No.: PCT/NL2018/050291
§ 371 (c)(1),
(2) Date: Oct. 31, 2019

(87) PCT Pub. No.: WO2018/203749
PCT Pub. Date: Nov. 8, 2018

(65) Prior Publication Data
US 2020/0055216 A1    Feb. 20, 2020

Related U.S. Application Data

(63) Continuation of application No. PCT/NL2018/050291, filed on May 3, 2018.

(30) Foreign Application Priority Data

May 3, 2017    (NL) ...................................... 2018839

(51) Int. Cl.
*B29C 45/00*    (2006.01)
*B29C 45/16*    (2006.01)
(Continued)

(52) U.S. Cl.
CPC ...... *B29C 45/0081* (2013.01); *B29C 45/1676* (2013.01); *B29K 2023/12* (2013.01); *B29L 2031/565* (2013.01)

(58) Field of Classification Search
None
See application file for complete search history.

(56) References Cited

U.S. PATENT DOCUMENTS

| | | |
|---|---|---|
| 3,537,676 A | 11/1970 | Miller |
| 6,447,280 B1 | 9/2002 | Grimm |

(Continued)

FOREIGN PATENT DOCUMENTS

| | | |
|---|---|---|
| DE | 10 2006 013 122 A1 | 9/2007 |
| EP | 0 903 213 A2 | 3/1999 |

(Continued)

*Primary Examiner* — Edmund H Lee
(74) *Attorney, Agent, or Firm* — Hoffmann & Baron, LLP

(57) ABSTRACT

A mould for injection moulding a closure assembly having a cap and lid includes a first and second mould part moveable with respect to each other. The lid includes a nipple made from a first material. The cap includes a dispensing passage to be sealed by the nipple and is made from a second material. The mould includes a holder adapted for receiving a pre-formed body with the nipple. This holder holds the body and nipple in place in a closure cavity for moulding the closure assembly. The holder includes a core having a recess for receiving the nipple. The holder further includes a tube part for insertion into the tubular nipple. This tube part can be connected with a suction source.

22 Claims, 14 Drawing Sheets

(51) Int. Cl.
    *B29K 23/00* (2006.01)
    *B29L 31/56* (2006.01)

(56) References Cited

U.S. PATENT DOCUMENTS

| | | |
|---|---|---|
| 2004/0119200 A1 | 6/2004 | Gram |
| 2004/0124558 A1 | 7/2004 | Gram |
| 2013/0200547 A1 | 8/2013 | Geibel, Jr. |

FOREIGN PATENT DOCUMENTS

| | | | |
|---|---|---|---|
| JP | H2-93247 U | | 7/1990 |
| JP | H5-81048 U | | 11/1993 |
| JP | 2005-119701 A | | 5/2005 |
| JP | 2005-178296 A | | 7/2005 |
| KR | 101943878 | * | 1/2019 |
| WO | 03/099544 A1 | | 12/2003 |
| WO | 2004/074129 A1 | | 9/2004 |
| WO | 2007/096309 A1 | | 8/2007 |

* cited by examiner

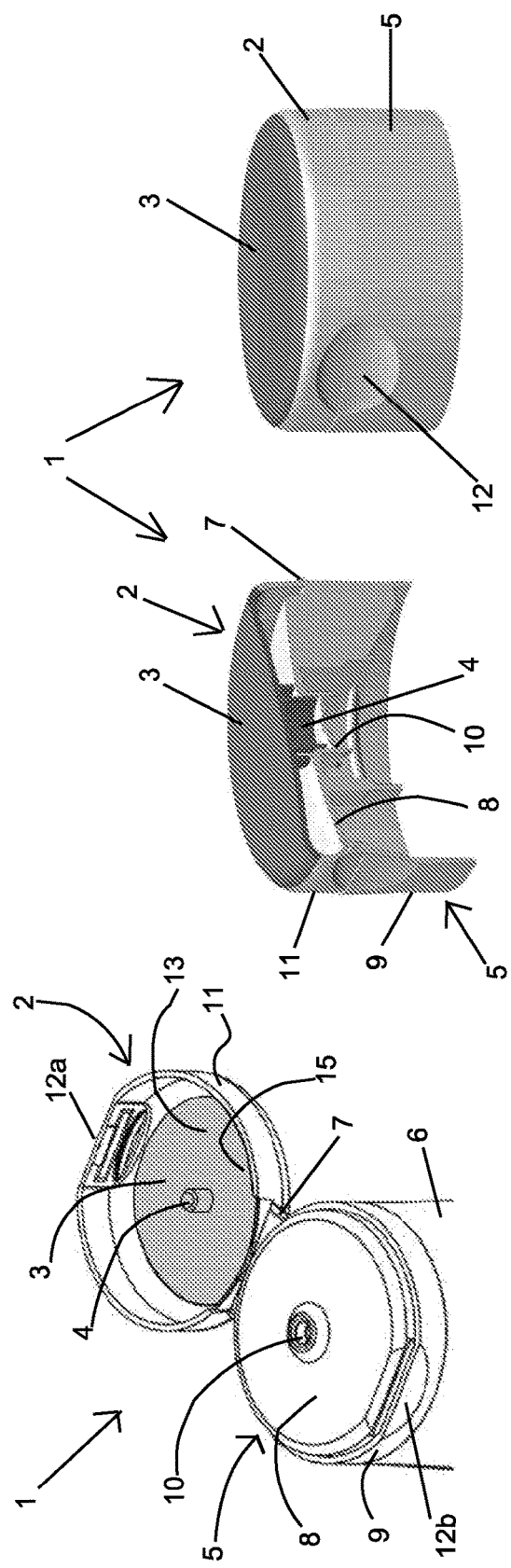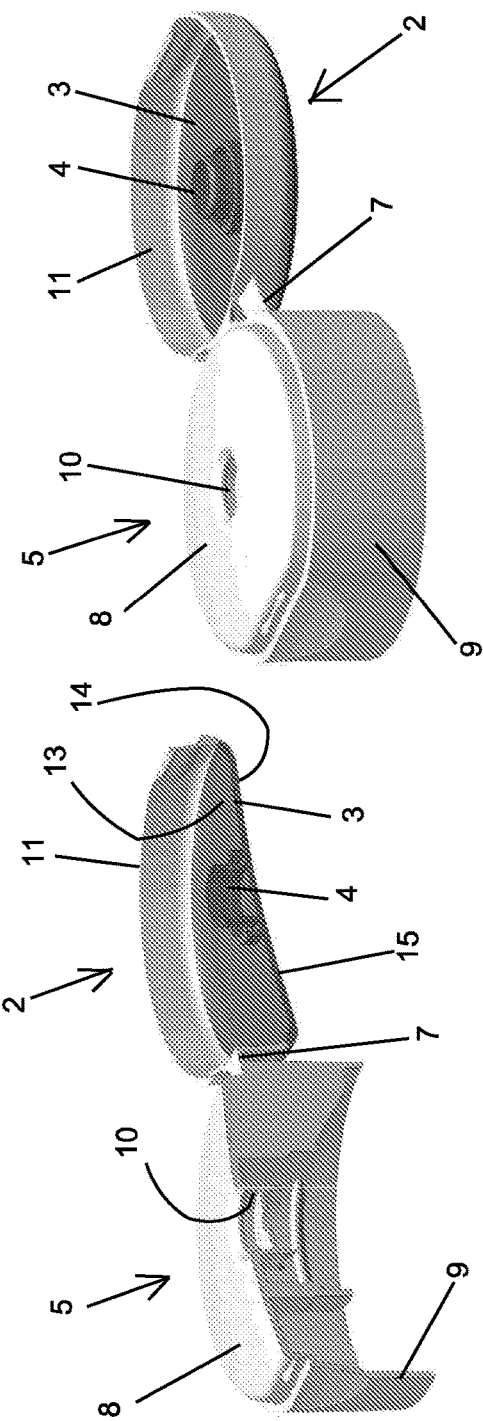

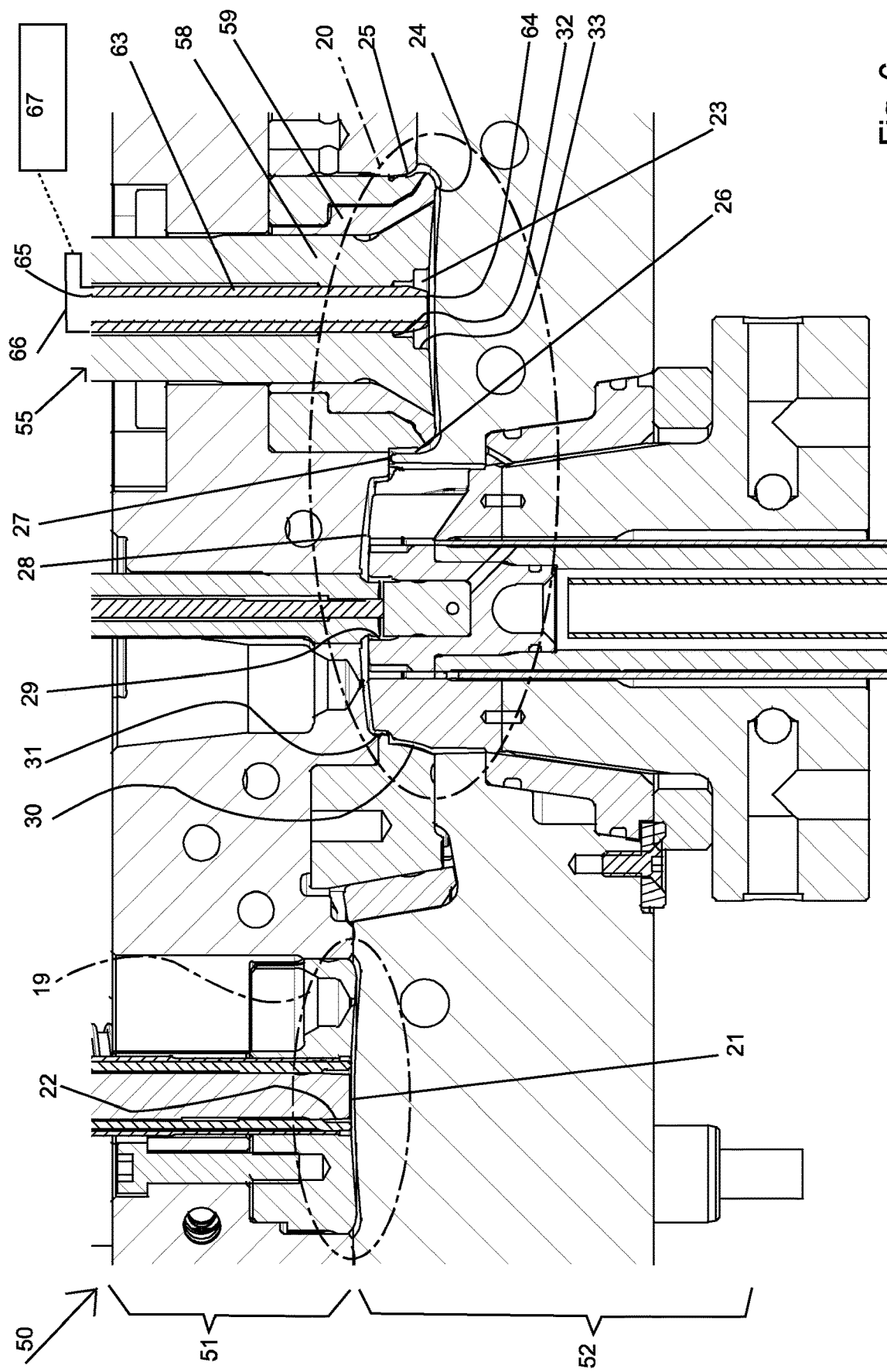

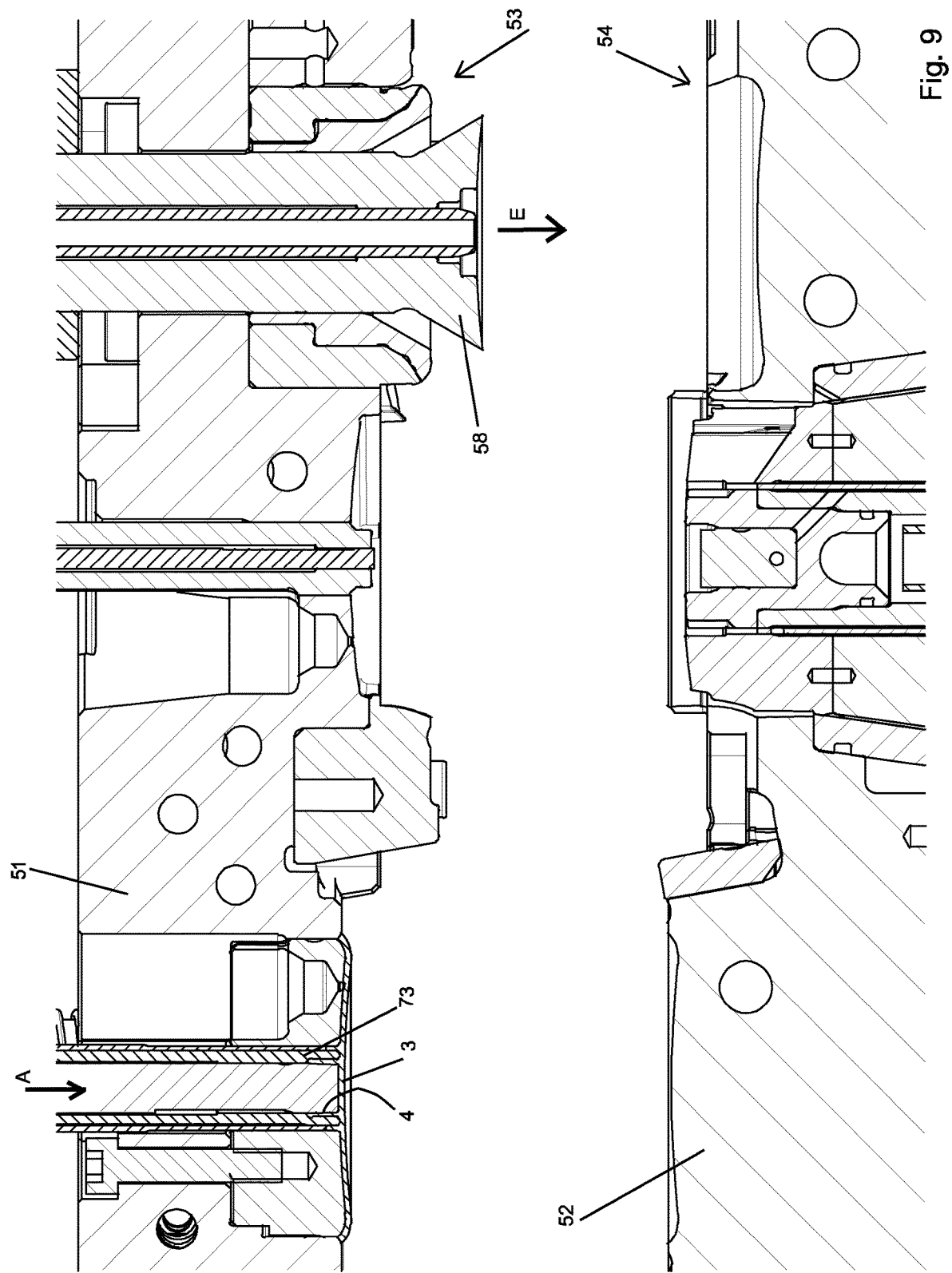

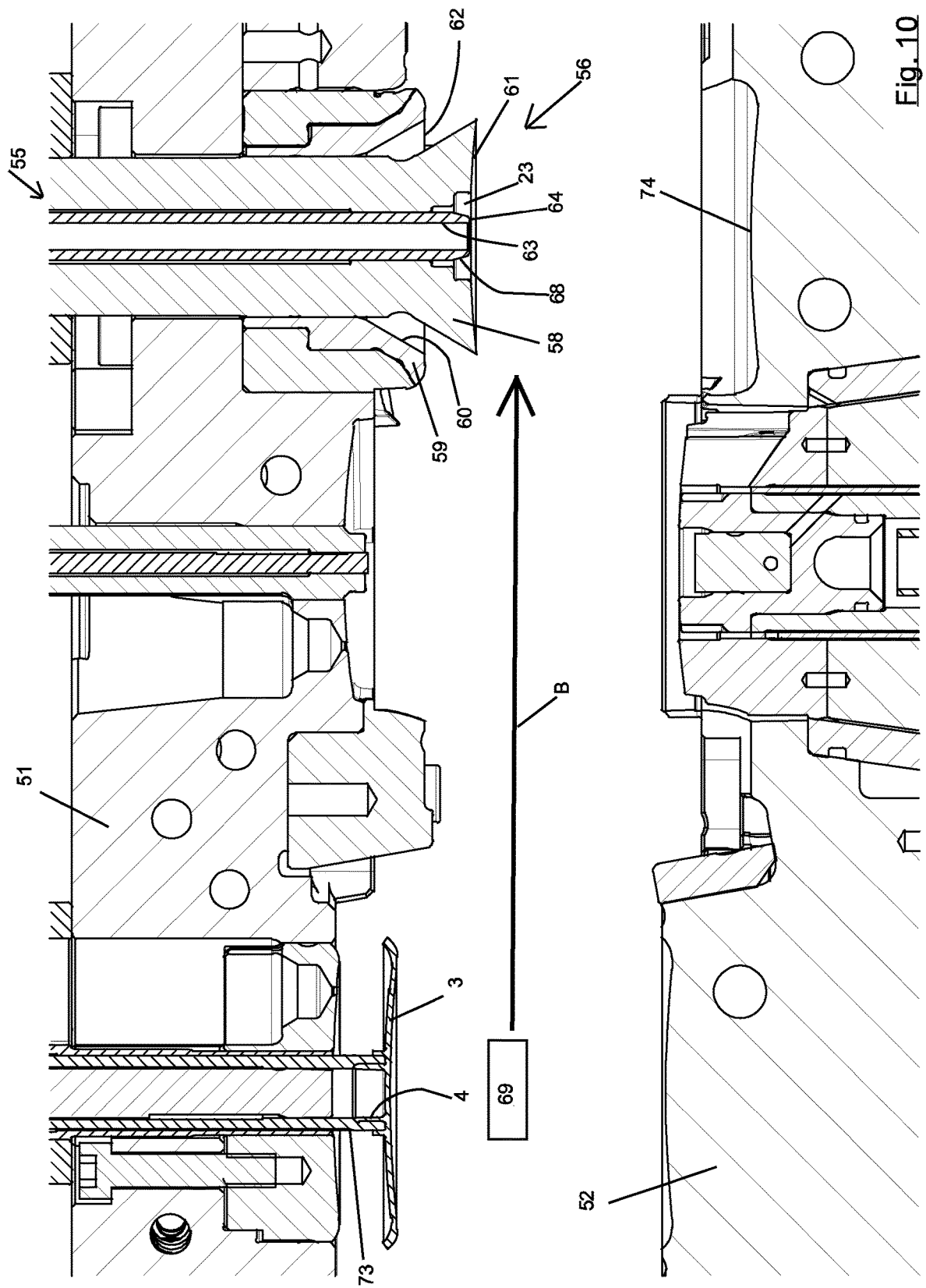

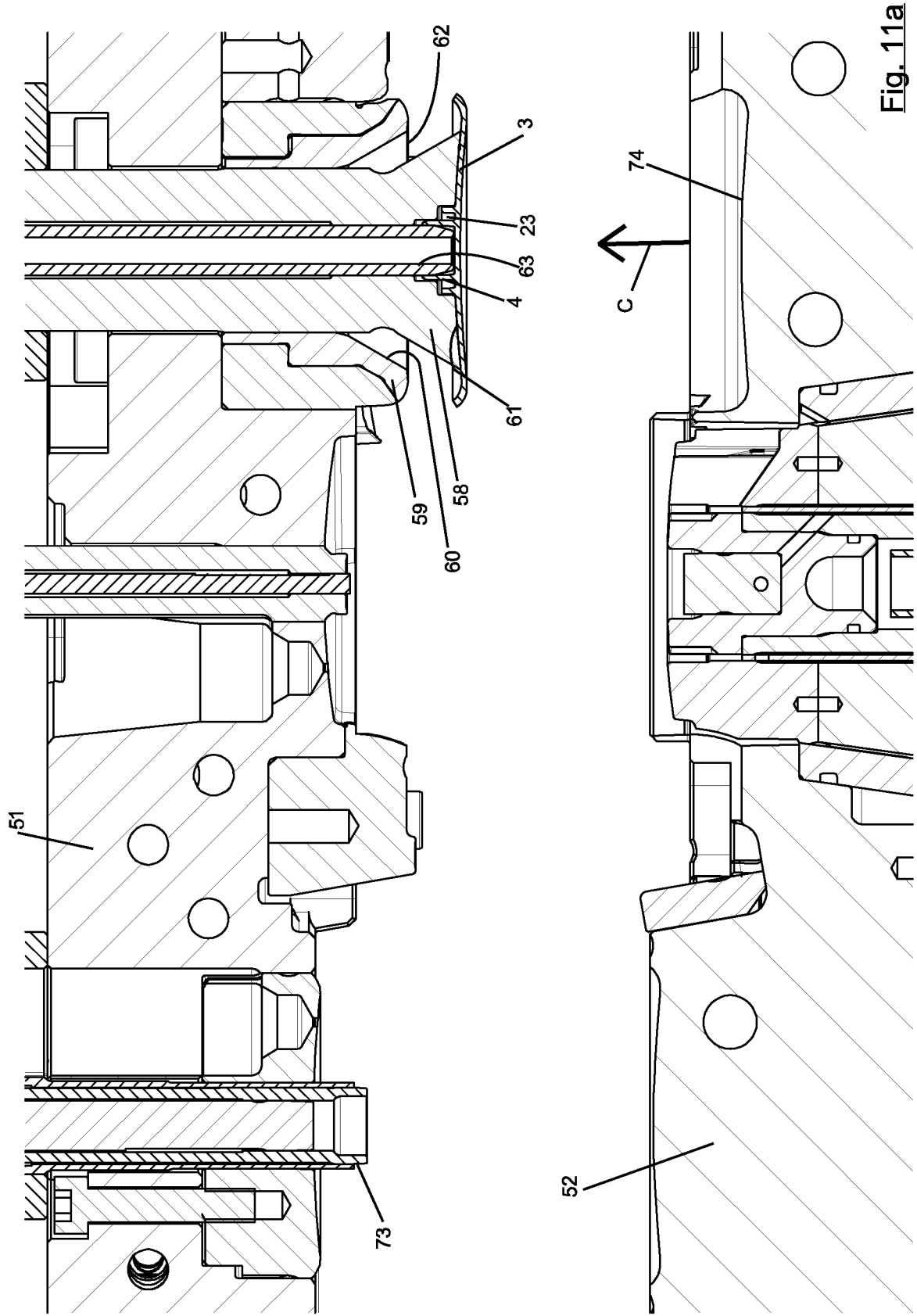

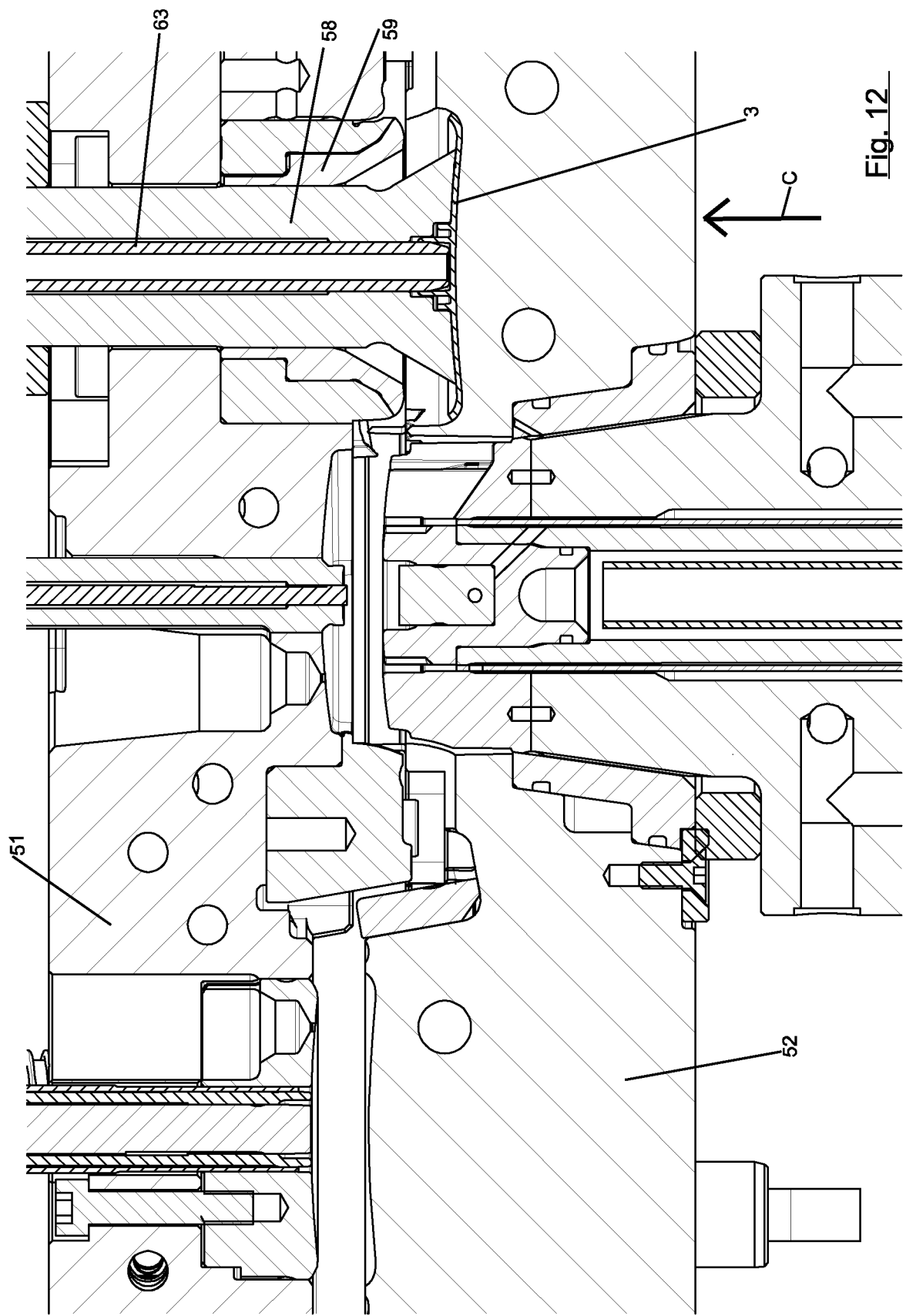

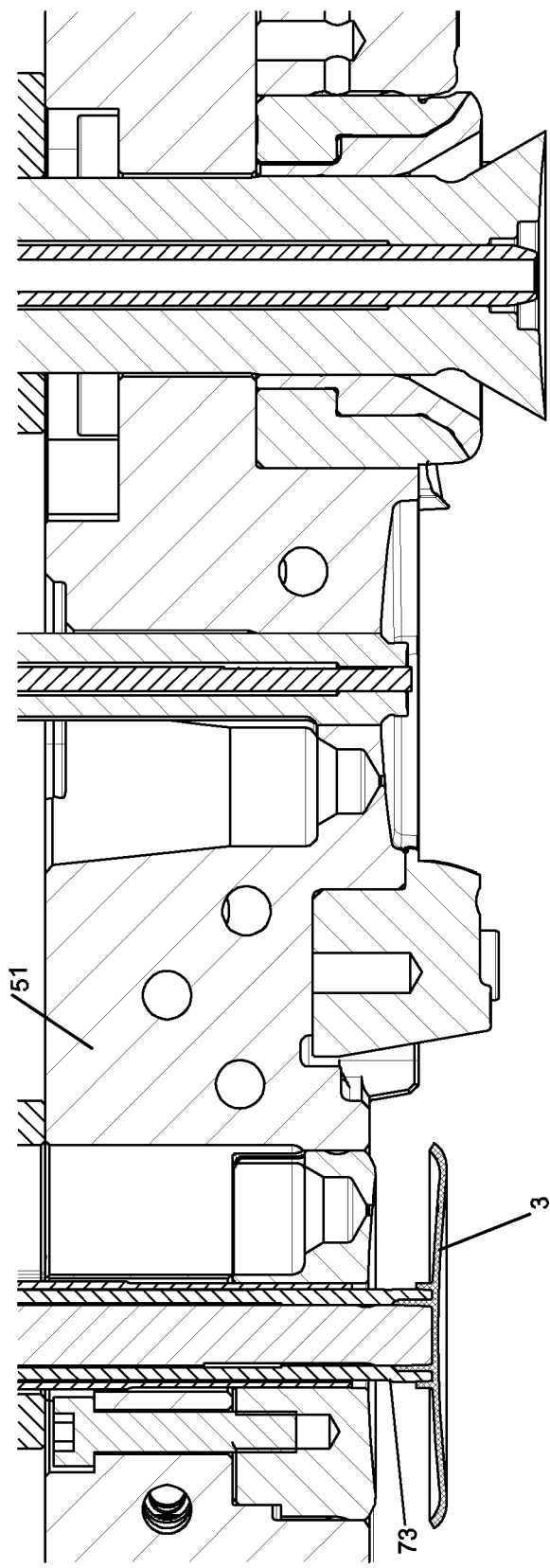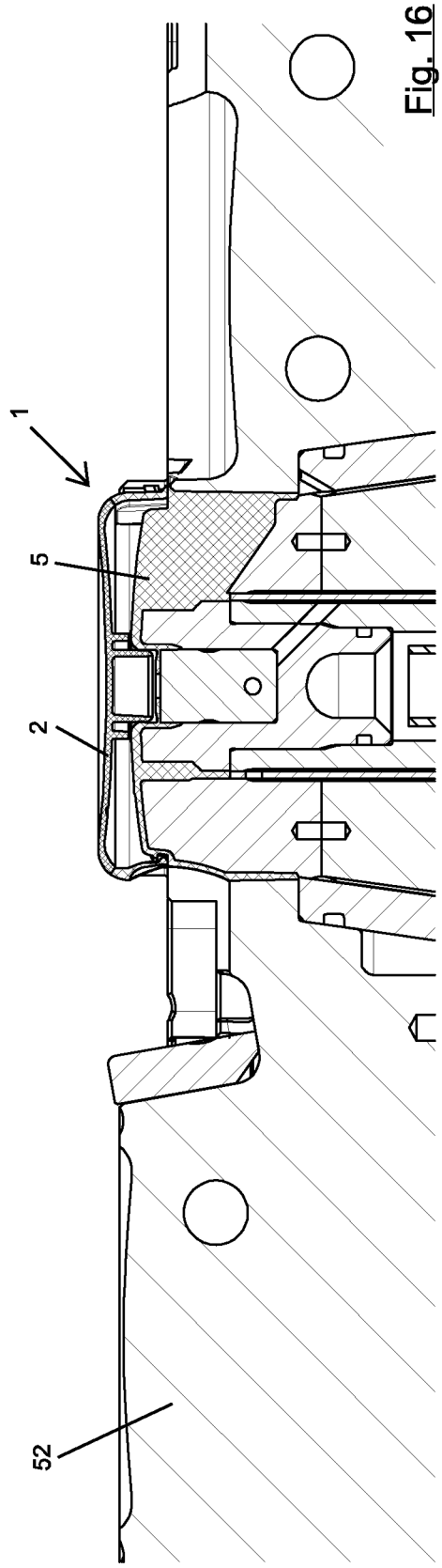
Fig. 16

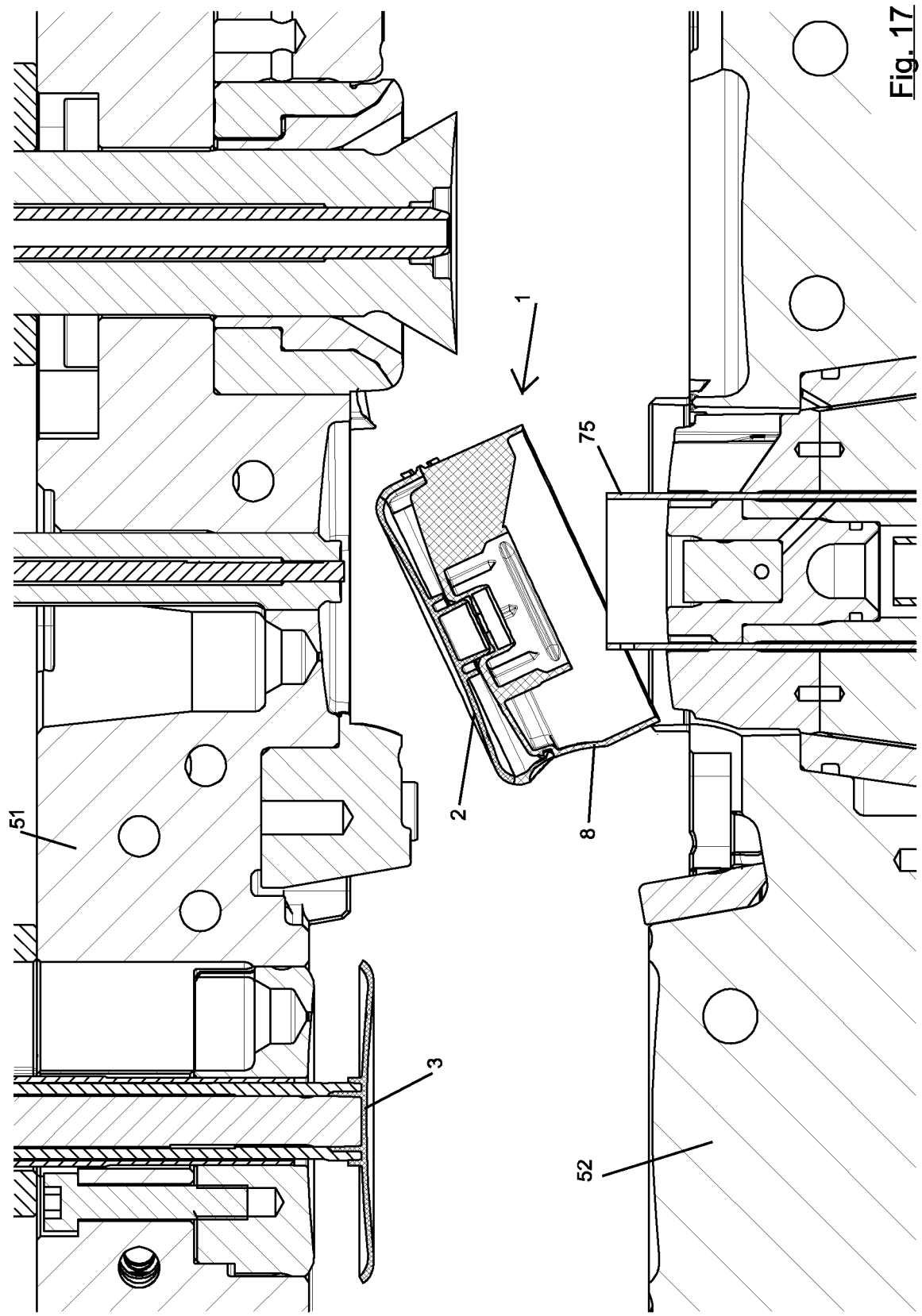

MOULD AND METHOD FOR INJECTION MOULDING A CLOSURE ASSEMBLY

CROSS-REFERENCE TO RELATED APPLICATIONS

This application is the National Stage of International Application No. PCT/NL2018/050291, filed May 3, 2018, which claims the benefit of Netherlands Application No. 2018839, filed May 3, 2017, the contents of which is incorporated by reference herein.

FIELD OF THE INVENTION

The invention generally relates to a mould for injection moulding a closure assembly having a lid comprising a body moulded from a first material and having a cap moulded from a second material.

BACKGROUND OF THE INVENTION

Products—like beverages, cosmetic creams, shampoo, soap, lotions, tooth paste etcetera—are frequently made available in a product container having a neck and provided with a closure assembly.

The closure assembly has a cap and a lid. The cap basically has a top wall provided with a dispensing passage for dispensing the product from the container and a peripheral skirt attached on the neck of the container. The lid is pivotably connected to the cap and has a nipple. The lid is pivotable between an open position and a closed position in which the nipple is sealingly received within the dispensing passage.

In closed position, the nipple received in the dispensing passage closes the dispensing passage to prevent product from being dispensed through the dispensing passage. In the open position the nipple is released from the dispensing passage and product to allow product to be dispensed.

In order to prevent product from being dispensed in the closed position, a good and reliable sealing between the dispensing passage and the nipple is of great importance.

Additionally there is a demand for closure assemblies having a cap and at least part of the lid made from different materials. The difference in materials might be very small, it might for example be a difference in only the colour. According to the invention, the difference in materials, which might be very small, might be found in a large range of differences. The difference might be a difference in colour (for example, one being light blue and the other dark blue, or one being grey and the other red), and/or a difference in mechanical properties (for example, one being a hard plastic and the other a soft plastic and/or one being a rigid plastic and the other an elastic plastic), and/or a difference in chemical properties (for example one being a homo-polymer of for example PP and the other being a co-polymer of for example PP) and/or a difference in transparency (for example one being transparent and the other being opaque), and/or a difference in thermal properties, and/or a large or very small difference in grade, and/or a difference in additives, like a difference in functional or decorative additives, etcetera.

In the field of injection moulding an assembly having parts made from two different materials, it is known to mould a first part of a first material in a first step and to mould subsequently in a second step the final assembly by injecting a plastic from a different material in a mould cavity in which the pre-moulded first part is arranged. The pre-moulded first part, which might have been made in a different mould or in a different cavity in the same mould, is placed in the mould cavity by means of a gripper. Examples of this type of moulding can be found in US-2004/0119200, US-2004/0124558, US-2013/0200547, EP-903213, WO-2007/096309, U.S. Pat. No. 6,447,280, and DE 102006013122.

Accordingly the object of the invention is providing a mould for injection moulding a closure assembly having a cap with a dispensing passage and a lid with a nipple, the cap and nipple being an integral unit, at least part of the lid being made from a first material, and the cap being made from a second material, which assembly provides a good and reliable sealing between the nipple and the dispensing passage.

SUMMARY OF THE INVENTION

This object is according to a first aspect of the invention achieved by providing a mould for injection moulding a closure assembly having a cap and lid. The lid comprises a nipple made from a first material. The cap comprises a dispensing passage to be sealed by the nipple and is made from a second material. The mould comprises a first and second mould part moveable with respect to each other. The mould comprises a holder adapted for receiving a preformed body with the nipple. This holder holds the body and nipple in place in a closure cavity for moulding the closure assembly. The holder comprises a core having a recess for receiving the nipple. The holder further comprises a tube part for insertion into the tubular nipple. This tube part can be connected with a suction source. The invention further relates to e method of operating the mould according to the invention.

More specifically, this object is achieved by providing a mould according to the present invention.

This mould according the present invention is designed for injection moulding a closure assembly of the type having a lid and cap, wherein the lid comprises a body moulded from a first material and provided with a tubular closing nipple projecting from an inner face of the body and moulded integrally with the body, wherein the cap is moulded from a second material and adapted to be attached onto a neck of a product container, the cap being integrally with and pivotably connected to the lid via a hinge, the cap having a top wall and a peripheral skirt, the top wall comprising a dispensing passage, wherein the lid is pivotable with respect to the cap between an open position and a closed position in which the tubular closing nipple is sealingly received within the dispensing passage; and wherein the body is moulded in a first step separate from a second step for moulding the cap and preceding this second step. In the second moulding step the cap and possibly parts of the lid (other than the body) are moulded. The hinge for the pivotable connection of the lid to the cap might be moulded in the first step or in the second step or might be provided in other manner.

The mould according to the present invention comprises a first mould part and a second mould part. The first and second mould parts are movable with respect to each other between a closed position and an open position. In the closed position a first mould face of the first mould part and a second mould face of the second mould part engage each other to define together a closure cavity for moulding the closure assembly. In the open position, the first and second mould face are separated from each other to expose the closure cavity for releasing a moulded closure assembly from the mould and placing a said body in the mould.

The mould according to the present invention further comprises a holder which is adapted for receiving a said body when the mould is in the open position, and holding said body in place inside and with respect to the closure cavity when the mould is in the closed position and receiving the second material for moulding the closure assembly.

According to the invention, the holder comprises a core and a tube part. The core has an end face. The end face is adapted to engage with the inner face of said body. Further, the end face is provided with a recess for receiving the tubular closing nipple of the pre-moulded body of the lid. This recess has a bottom and a side wall extending from the bottom to the end face. The tube part projects from the bottom of the recess and is adapted to be received within the tubular closing nipple. The tube part has a first tube end and second tube end. The first tube end is open and faces away from the bottom of the recess. The second tube end is in fluid connection with a connection port connectable to a suction and/or pressure source.

When the mould is in its open position for releasing a moulded closure assembly, the body of a lid (for a next closure assembly to be formed) is placed on the core of the holder with the tube part of the holder inserted in the nipple. The tube part and the nipple together function as a centring mechanism which corrects for positional inaccuracies in the control of the manipulator, such as a gripper, used to transfer the body with nipple to the core and to place it onto the core.

Because the position of the tube part with respect to the mould is accurately defined, insertion of this tube part into the nipple accurately defines the position of the nipple with respect to the mould. In closed position of the mould, this results in the position of the nipple with respect to the mould cavity and in turn with respect to the negative/reverse mould impression of the dispensing passage being very accurately defined. An accurate positioning of the nipple with respect to the negative/reverse mould impression of the dispensing passage is of importance, because in use (of the resulting final product) the hinge, which is in practise flexible, is a cause of inaccuracies in the positioning of the nipple with respect to the dispensing passage. Avoiding other inaccuracies reduces problems caused by inaccuracies of the hinge. The more accurate the positioning of the nipple with respect to the dispensing passage is in the final, resulting product, the more reliable the sealing will be.

In case the body of the cap might have one or more side wall parts extending about parallel with the nipple, the end face of the core will be mated to the inner face of the body of the lid. In this respect it is to be noted that parts moulded from plastic have in general a shrinkage in the range of 1-2%, which shrinkage is in general defined with respect to the dimensions of the object 24 hours after it has been taken out of the mould. A large part of this shrinkage already occurs within the first second or first seconds after taking the object out of the mould. The core being mated to the inner face of the body might take into account that shrinkage measured 24 hours after the body has been taken out of the mould for forming said body, that this shrinkage did not yet fully occur.

According to a further embodiment of the first aspect of the invention, the recess has recess dimensions which are defined by the side wall of the recess and which are oversized with respect to transverse dimensions of the tubular closing nipple transverse to the direction in which the tubular closing nipple projects from the inner face of the body. These recess dimensions being oversized with respect to the transverse dimensions of the nipple, prevents the outside surface of the nipple of the pre-moulded body from contact with the mould. Such contact might result in scratches or other undesired irregularities on the outside surface of the nipple. Taking into account that the sealing of the nipple inside the dispensing passage is obtained by the outside surface of the nipple, this oversize contributes further in assuring a good and reliable sealing between the nipple and the dispensing passage.

According to a further embodiment of the first aspect of the invention, the oversize of the recess dimensions with respect to the transverse dimensions of the tubular closing nipple is at least 0.01 mm, such as at least 0.5 mm or at least 0.75 mm. The oversize might for example be in the range 0.01 mm to 1 mm, or in the range of 0.01 mm to 0.5 mm or in the range of 0.5 mm to 1 mm or in the range of 0.4 to 1.5 mm. According to a still further embodiment this oversize might even be larger than 1 mm or 1.5 mm. For practical reasons the oversize will likely not be larger than 2-4 mm, but a larger oversize is very well conceivable.

According to a further embodiment of the first aspect of the invention, the depth of the recess is larger than the length of the tubular closing nipple. The depth of the recess might be at least 0.5 mm larger, such as at least 1 mm larger, than the length of the tubular closing nipple. The depth of the recess might even be substantially larger than 1 mm, such as 5 mm or larger. Having the depth of the recess larger than the nipple further contributes in avoiding contact between the outside of the pre-moulded nipple and the mould and contributes further in assuring a good and reliable sealing between the nipple and the dispensing passage.

According to a further embodiment of the first aspect of the invention, the tube part is, at its outside, provided with a guiding surface narrowing in the direction of the first tube end and extending up to the first tube end. This guiding surface might comprise a rounding off at the first tube end and/or a taper, like a conical taper. Such a taper might even extend over the entire length of the tube part.

According to a further embodiment of the first aspect of the invention, the tube part has over at least a part of its length, viewed in its circumferential direction, an outer dimension which mates, viewed in circumferential direction of the tubular closing nipple, (at least part of) an inner dimension of the tubular closing nipple. This ensures a good sealing with respect to the suction force applied by the suction source during moulding.

According to a further embodiment of the first aspect of the invention, the holder is mounted in the first mould part; and the tube part is moveable in lengthwise direction with respect to the first mould part. The tube part being moveable in lengthwise direction to the mould part in which it is provided, allows the body of the lid being accurately received on the tube part without damaging the body, causing major scratches on the body or deformation of the body. According to a still further embodiment, at least a part of the core is, with respect to the first mould part, moveable in a direction transverse to the end face of the core. This further contributes in receiving the body of the lid on the core without damaging the body, causing major scratches on the body or deformation of the body. The tube part might be fixed or moveable with respect to the moveable part of the core. Note that, the movable part of the core might be sub-part of the core which is moveable or might be the entire core in which case the entire core is moveable.

According to a further embodiment of the first aspect of the invention, the core comprises a central core part and a surrounding core part having a bore slidably receiving the central core part to allow the central core part to move between an extended position and retracted position, wherein in the extended position the central core part projects from the surrounding core part and wherein in the retracted position the end face of the central core part is flush with the end face of the surrounding core part; and in which the recess is provided in the end face of the central core part. Having a central core part slidingly received in a bore of a surrounding core part further contributes in avoiding damaging the body, causing major scratches on the body or deformation of the body when the body is received on the core. In this embodiment the tube part might be fixed relative to the central core part so that it moves simultaneously with the central core part.

According to a further embodiment of the first aspect of the invention, the first mould part and second mould part further define together, in the closed position of the mould, a body cavity for moulding a said body; or a third mould part defines together with the first mould part or second mould part, in the closed position of the mould, a body cavity for moulding a said body. This allows one single mould to mould simultaneously a final closure assembly in the closure cavity and a body of a cap for a closure assembly in the body cavity (which body is to be used for moulding a closure assembly in a later moulding action).

According to a further embodiment of the first aspect of the invention, the first mould part forms the hot side of the mould and the second mould part forms the cold side of the mould; or the first mould part forms the cold side of the mould and the second mould part forms the hot side of the mould.

According to a further embodiment of the first aspect of the invention, the mould is provided with a plurality of closure cavities, each closure cavity being provided with a holder. This allows a plurality of closure assemblies to be formed simultaneously with one single mould. According to a still further embodiment, the mould is provided with a plurality of body cavities, which is the same as the number of closure cavities. This allows using a single mould for simultaneous moulding of a plurality of closure assemblies as well as a same plurality of bodies to be used for moulding closure assemblies in a later moulding action. In this embodiment, the mould might be a so called stack mould having a first stack and a second stack, and in which the plurality of closure cavities is arranged in the first stack and the plurality of body cavities in the second stack.

According to a second aspect of the invention, there is provided a mould assembly comprising a mould according to the first aspect of the invention and a suction source connected to the connection port.

According to a further embodiment of the second aspect of the invention, the mould assembly further comprising a pressure source connected to the connection port, wherein a three-way-valve is provided which can be switched between a suction position in which the connection port is connected to the suction source and a pressure position in which the connection port is connected to the pressure source.

According to a further embodiment of the second aspect of the invention, the mould assembly comprises a gripper adapted to pick up one or more bodies and to deliver the one or more bodies each onto a core with the tube part inserted into the nipple.

According to a third aspect of the invention, a method is provided for making a closure assembly is of the type having a lid and a cap, wherein the lid comprises a body moulded from a first material and provided with a tubular closing nipple projecting from an inner face of the body and moulded integrally with the body, wherein the cap is moulded from a second material and adapted to be attached onto a neck of a product container, wherein the cap is integrally with and pivotably connected to the lid via a hinge, the cap having a top wall and a peripheral skirt, the top wall comprising a dispensing passage, wherein the lid is pivotable with respect to the cap between an open position and a closed position in which the tubular closing nipple is sealingly received within the dispensing passage;

the method comprising the following steps:
providing a mould according to the present invention;
moulding a said body from a first material to obtain a moulded body;
inserting the tube part into the nipple of the moulded body;
placing the moulded body on the core;
closing the mould;
moulding the closure assembly by injecting into the closure cavity a second material different from the first material; and
opening the mould and removing the moulded closure assembly from the mould.

According to a further embodiment of the third aspect of the invention, the step of moulding the body comprises injecting the first material into a body cavity formed in the mould; wherein the method further comprises the steps of:
picking up a moulded body from a body cavity;
transferring the body picked up to a closure cavity.

It is noted a moulded body picked up can be transferred, directly after being picked up, to the closure cavity to process in a closure assembly moulded in the next moulding action of the mould. However, it is also possible that a moulded body picked up is transferred, via a detour, to the closure cavity. Transfer via a detour meaning that the body is first transferred to a location outside the mould and kept there during the first next moulding action, to transfer it into the mould to the closure cavity after the next moulding action or later moulding action.

BRIEF DESCRIPTION OF THE DRAWINGS

These features, aspects and advantages of the present invention will become better understood from the accompanying drawing, which will be discussed further below in the section 'detailed description of the invention'. In the drawings:

FIG. 1 shows, by way of example, a perspective view of a first closure assembly of the type made with the mould, mould assembly and/or method according to the invention;

FIGS. 2-5 shows, by way of example, a second closure assembly of the type made with the mould, mould assembly and/or method according to the invention; FIG. 2 being a perspective view, in cross section, of the assembly in closed position, FIG. 3 being a perspective view of the assembly in closed position; FIG. 4 being a perspective view, in cross section, of the assembly in open position, and FIG. 5 being a perspective view of the assembly in open position;

FIG. 6 shows a cross section of a mould according to the invention, the mould being shown in closed and empty condition;

FIGS. 8-14 show, in cross section, several steps in the production of the closure assembly of FIGS. 2-5 with the mould of FIGS. 6-7;

FIG. 8 showing a first step of a start up phase of a series of moulding cycles;

FIG. 9 showing a second step of the start up phase of a series of moulding cycles, which second step of the start up phase being the first step of a moulding cycle;

FIG. 10 showing a second step of the moulding cycle;
FIG. 11a showing a third step of the moulding cycle;
FIG. 11b showing a detail of FIG. 11a;
FIG. 12 showing a third step of the moulding cycle;
FIG. 13 showing a fourth step of the moulding cycle;
FIG. 14 showing a fifth step of the moulding cycle;
FIG. 16 showing a sixth step of the moulding cycle;
FIG. 17 showing an eighth step of the moulding cycle;
which eighth step is, in case of a next cycle, followed by the first step shown in FIG. 9.

DETAILED DESCRIPTION OF THE INVENTION

Figure 7:
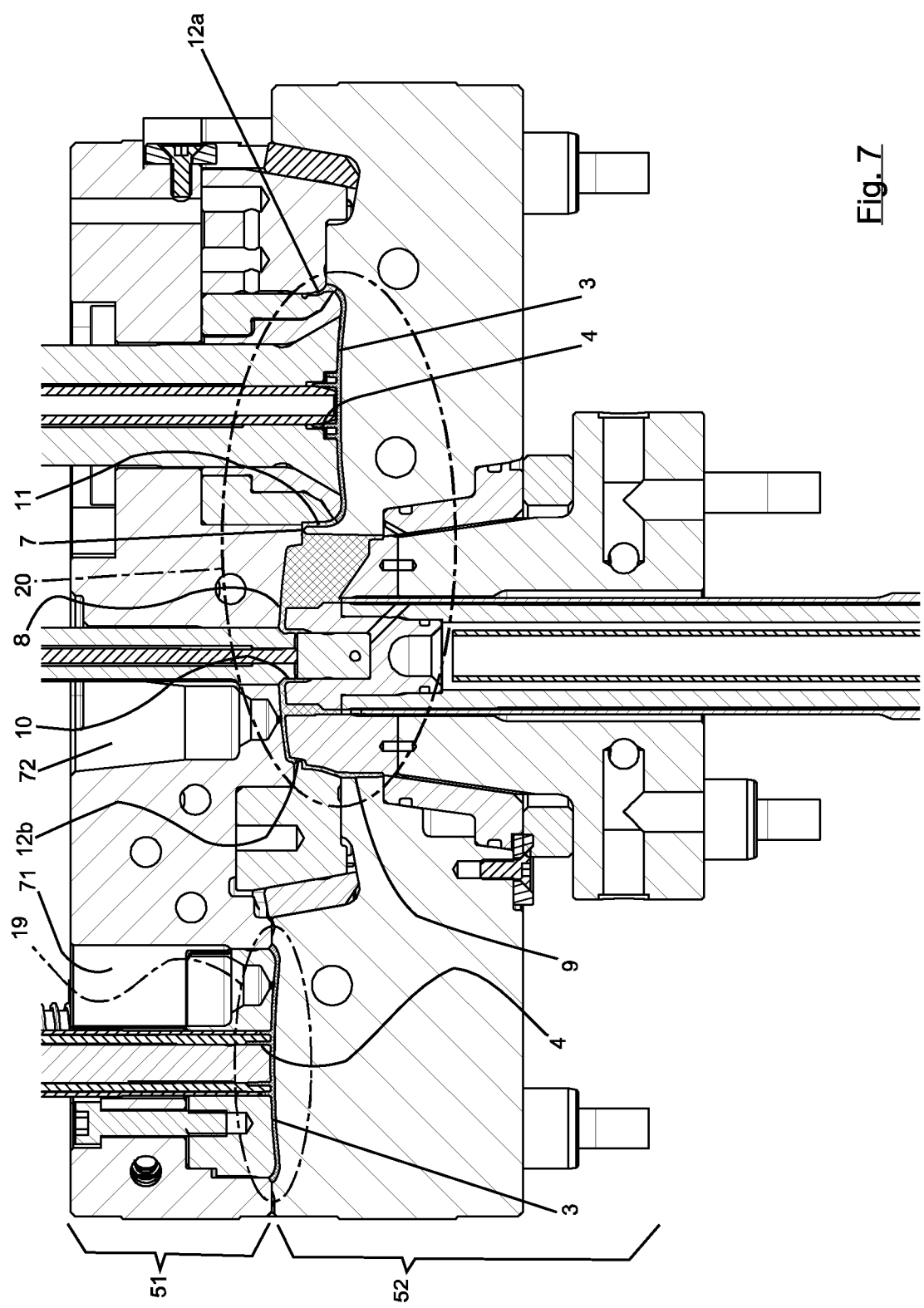
FIG. 7 shows, in cross section, the mould of FIG. 6, the mould now being filled with moulded components.

FIG. 1 shows, by way of first example, a first closure assembly of the type made with the mould, mould assembly and/or method according to the invention. FIGS. 2-5 shows, by way of second example, a second closure assembly of the type made with the mould, mould assembly and/or method according to the invention. In both closure assemblies the same reference numbers have been used for corresponding parts.

The type of closure assembly will be described with reference to both examples, i.e. with reference to FIGS. 1-5.

The closure assemblies shown in FIGS. 1-5 are in general indicated with 1 and are of the type having a lid 2 and a cap 5 connected to the lid 2 by a hinge 7. In general the hinge 7 is formed together with moulding the lid 2, with moulding the cap 5, or with moulding the lid 2 and cap 5. However, it is also conceivable that the hinge is a separate element, which has been made beforehand and is placed in the mould before moulding to become an integral part with the remainder of the closure assembly when moulding the lid and/or cap.

The lid 2 comprises a body 3 moulded from a first material. In FIG. 1 this first material is shown in grey and in FIGS. 2-5 this first material is shown in a shade of grey darker than the other parts of the closure assembly. The body of the lid 2 is provided with a tubular closing nipple 4. The term tubular indicates that it is, like a tube, a hollow part having one open end and an opposing end, the opposing end being closed due to the nipple 4 projecting from the inner face 13 of the body 3 and being integrally moulded with the body 3. The inner face of the body 3 is the side of the body facing the cap when the closure assembly is closed. The outer face 14 of the body being the side of the body exposed to the surrounding when the closure assembly is closed.

The lid 2 further has a skirt 11 extending in a direction transverse to a top part 15 of the lid 2. In the FIGS. 1-5 this top part 15 basically coincides with the body 3 of the lid 2. In the examples shown in all the figures of this application, the skirt 11 of the lid 2 is made from a material different than the first material from which the body 3 and nipple 4 are made. It is however to be noted that, according to the present invention, the entire skirt 11 or parts of the skirt 11 of the lid 2 might be made from the same first material as the body 3. In case the entire skirt 11 is made from the first material, basically the entire lid 2 is made from this first material. It is, according to the present invention, also conceivable that only part of the top part 15—for example a central part carrying the nipple 4 or a strip carrying the nipple and extending transverse across the top part 15—is made from the first material. For the concept of this invention it is of importance that 'the part of the lid 2 carrying the nipple 4' is made from the first material. In this application, this "part of the lid 2 carrying the nipple 4 (and made from the first material)", is indicated with the term "body".

The cap 5 is moulded from a second material and adapted to be attached onto a neck 6 of a product container. The prior art teaches all kinds of manners for attaching such a cap to the neck of a product container. The closure assembly might be a separate component to be mounted onto the neck, but it is also conceivable that the neck 6 and product container are integrally moulded with or even simultaneously with the cap itself.

The second material is different from the first material. The difference between the first material and the second material might be very small, it might for example be just a difference in colour. According to the invention, the difference between the first and second material might be found in a large range of types of differences. The difference might be a difference in colour (for example, one being light blue and the other dark blue, or one being grey and the other red), and/or a difference in mechanical properties (for example, one being a hard plastic and the other a soft plastic and/or one being a rigid plastic and the other an elastic plastic), and/or a difference in chemical properties (for example one being a homo-polymer of for example PP and the other being a co-polymer of for example PP) and/or a difference in transparency (for example one being transparent and the other being opaque), and/or a difference in thermal properties, and/or a large or very small difference in grade, and/or a difference in additives, like a difference in functional or decorative additives, etcetera.

The cap 5 has a top wall 8 and a peripheral skirt 9. The top wall is provided with a dispensing passage 10 allowing product from the product container to be dispensed.

The lid 2 is pivotable with respect to the cap 5 between an open position—see FIGS. 1, 4 and 5—and a closed position—see FIGS. 2-3 —. In the closed position, nipple 4 is sealingly received within the dispensing passage 10 to prevent product from within the container to pass through the dispensing passage to leave the container.

The body 3 is moulded in a first step separate from and preceding a second moulding step. This means that the body 3 is a pre-made part which is placed in the mould preceding the second moulding step.

With reference to FIGS. 6-17, the mould—generally indicated with 50—according to the invention, its functioning and the method according to the invention will be described. The mould shown in FIGS. 6-17 is designed for making the closure assembly of FIGS. 2-4. In as far as parts of the closure assembly 1 are shown in these drawings, these parts are indicated with the same reference numbers as used in FIGS. 1-5.

Referring to FIGS. 6-7, the mould 50 is shown in closed condition. FIG. 6 shows the mould empty, i.e. without any moulded component and FIG. 7 shows the mould filled with moulded components.

The mould 50 has a first mould part 51 and a second mould part 52. In the closed condition these mould parts 51, 52 together define two mould cavities, a first mould cavity being indicated with the dashed oval 19 on the left and the second mould cavity being indicated with the dashed oval 20 on the right.

The first mould cavity 19 is designed for moulding the body 3 together with the nipple 4, see FIG. 7. For this purpose the first mould cavity 19 comprises a body cavity 21 defining the body 3 and a nipple cavity 22 defining the nipple 4. The body cavity and nipple cavity are mutually connected so that they can be filled with a first material injected through a single (hotrunner) nozzle 71. Note however that also multiple nozzles might be used.

The second mould cavity is also called the closure cavity 20. The closure cavity 20 is designed for receiving a body 3 with nipple 4 and subsequently moulding the closure assembly of the type described earlier. This type of closure assembly has—see FIG. 7—a cap 8, 9 and a lid 3, 11 which are connected by a hinge 7. The cap comprises a top wall 8 and peripheral skirt 9. The top wall 8 is provided with a dispensing passage 10. The lid comprises a body 3 and skirt 11. The body 3 is on its inner face 13 provided with a tubular nipple 4. In order to be able to lock the lid in closed condition on the cap, the lid is provided with a first part 12a of a locking mechanism and the cap is provided with a second part 12b of a locking mechanism. For the purpose of moulding the closure assembly, the closure cavity 20 has—see FIG. 6—a nipple recess 23 for receiving the nipple 4 of a pre-moulded body 3, a body location 24 for receiving the pre-moulded body 3, a cavity 25 for moulding the first part 12a of the locking mechanism, a cavity 26 for moulding the skirt 11 of the lid 2, a cavity 27 for moulding the hinge 7, a cavity 28 for moulding the top wall 8 of the cap, a cavity 29 for moulding the dispensing passage 10, a cavity 30 for moulding the peripheral skirt 9 of the cap, and a cavity 31 for moulding the second part 12b of the locking mechanism. All these cavities are mutually connected so that they can be filled with a second material injected through a single (hotrunner) nozzle 72. Note however that also multiple nozzles might be used.

Turning now to FIGS. 8-14, several steps of a moulding cycle will be described to elucidate the invention further.

Figure 8:
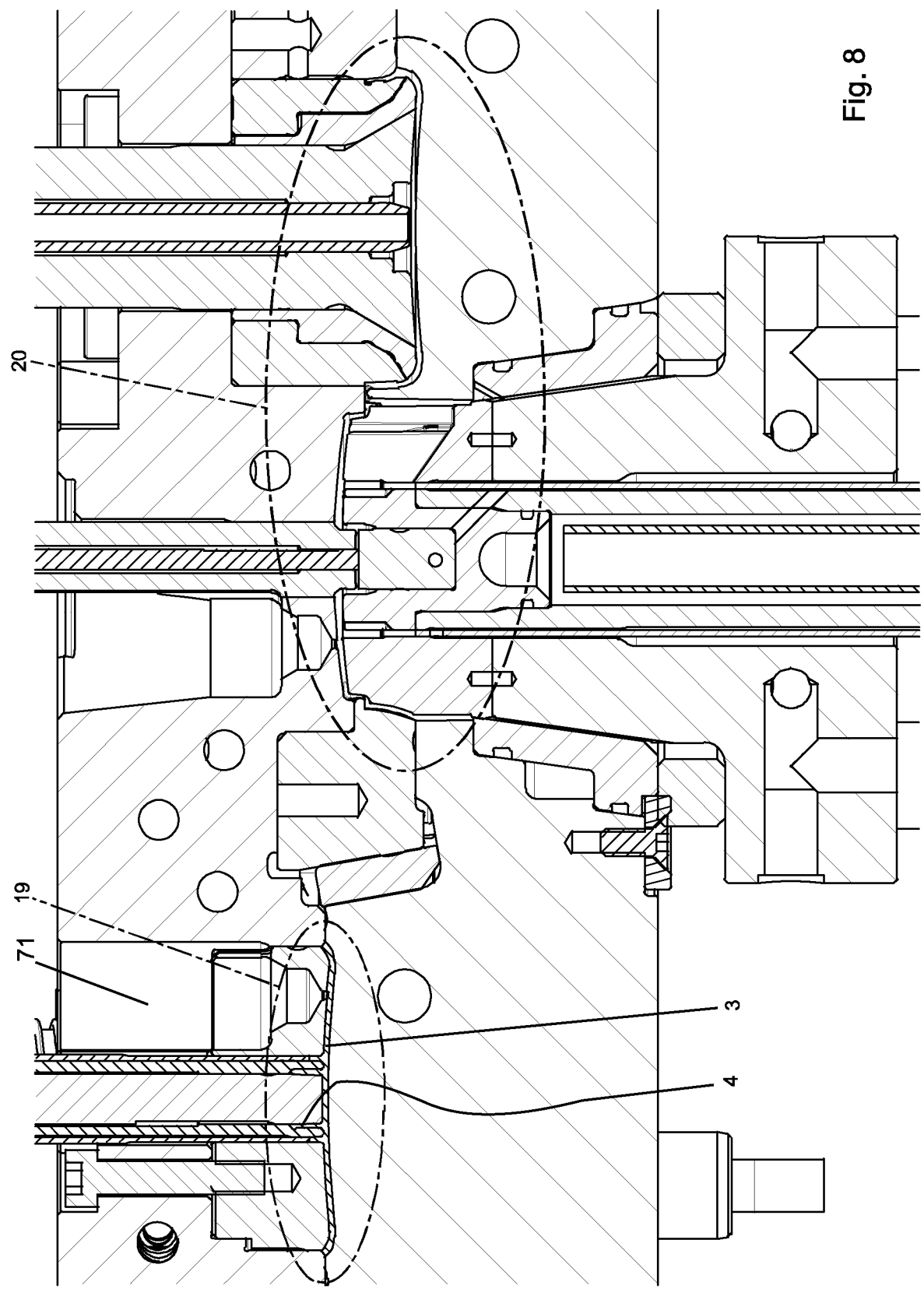

Starting with an empty mould as shown in FIG. 6, there will be started with a start-up phase. The first step of this start-up phase is shown in FIG. 8. A first material is injected via nozzle 71 into the first mould cavity 19. This results in a body 3 with nipple 4 being formed in the first mould cavity 19. The second mould cavity 20 is not yet filled and stays empty in this start-up phase.

After the body 3 with nipple 4 has been formed by injecting the first material into the first mould cavity 19, the mould 50 is opened by moving the first mould part 51 and second mould part 52 away from each other. When opening the mould, also the central core part 58 is moved—as indicated with arrow E in FIG. 9—to a position projecting from the first mould face 53. Projecting the central core part 58 can take simultaneously with opening the mould 50 or after opening the mould 50. This results in the condition as shown in FIG. 9. In this condition, the first mould face 53 of the first mould part 51 is disengaged from the second mould face 54 of the second mould part 51 to expose both mould faces.

Next the ejector 73 is moved—as is indicated with arrow A in FIG. 9—to a position projecting from the first mould face 53. This results in the condition as shown in FIG. 10.

Next, the moulded body 3 with nipple 4 is picked up from the ejector 73 by a relocation gripper 69. As indicated with arrow B in FIG. 10, this relocation gripper 69 brings the moulded body 3 with nipple 4 to the projecting central core part 58 of the holder 55, which is associated with the closure cavity 20. Arrived at the central core part 58, the relocation gripper 69 places the body 3 with nipple 4 on the end face 61 of the central core part. This results in the condition shown in FIG. 11a and FIG. 11b which is an enlarged detail of FIG. 11a.

Figure 11B:
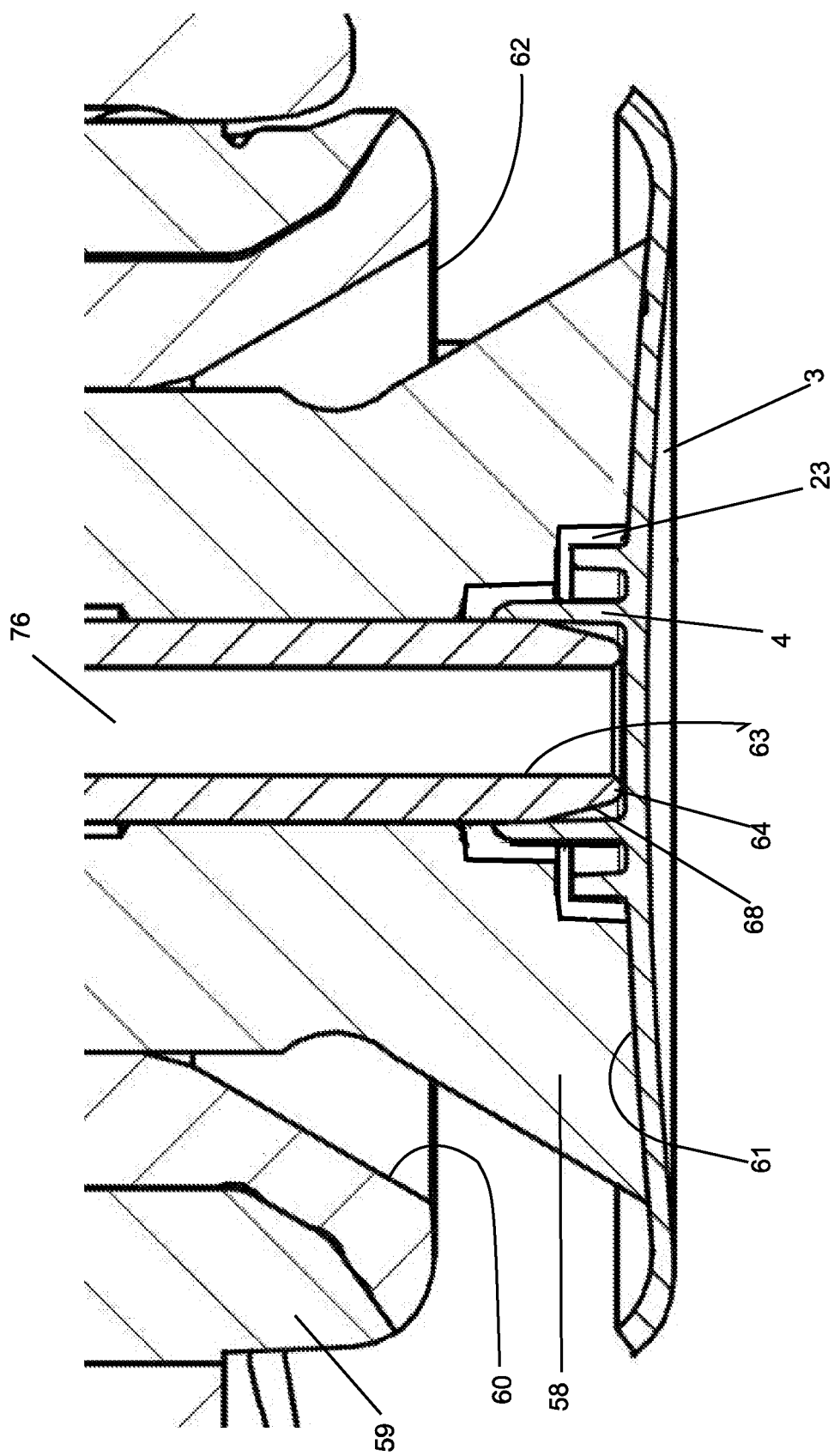

As can be seen in FIG. 11, see especially the enlarged detail shown in FIG. 11b, the central core part 58 is provided with a recess 23 for receiving the nipple 4. This recess is, in this application also called, the nipple recess 23. This nipple recess 23 is oversized with respect to the radial dimensions (=transverse dimensions) of the nipple 4 as well as with respect to the axial dimensions of the nipple 4. The recess 23 being oversized with respect to the radial (/transverse) dimensions of the nipple 4, prevents the circumferential outer surface of the nipple from contacting the mould, which in turn prevents the nipple from being scratched or otherwise damaged due to contact with the mould. Taking into account that the nipple 4 serves the purpose of providing a sealing engagement with the inner wall of the dispensing passage, this results in in improved closure of the dispensing passage 10. The recess 23 being oversized with respect to the axial dimensions of the nipple, prevents the axially facing surface of the nipple from being scratched or damaged otherwise. This might similarly contribute in improved closure of the dispensing passage.

As can further be seen in FIG. 11, especially in the enlarged detail of FIG. 11b, a tube part 63 is arranged inside the tubular nipple 4. In order to allow easy insertion of the tube end 64 of the tube part 63 into the nipple 4, the tube part 63 is provided with a conical or slanting guiding surface 68. Taking into account that the position of the tube part 63 with respect to the closure cavity 20 is fixed and very accurately defined, the position of the nipple 4 with respect to the dispensing passage of the closure assembly to be moulded in the closure cavity will be very accurately defined as well. The tube part fixes the position of the body 6 with respect to the closure cavity and prevents the body 6 from movement during injection of the second material. When in the position as shown in FIGS. 11a and 11b, the mould 50 can be closed. This is indicated with arrow C in FIG. 11a. This results in the condition of FIG. 12. In the condition of FIG. 12 the mould part 51 and mould part 52 approached each other to a distance that that the body 6 is received within a body recess 74 formed in the mould part 52. As from this moment, further movement of the mould part 52 in the direction of arrow C with respect to mould part 51 results in the central core part 58 being pushed back into the surrounding core part 59. The central core part 58 is for this purpose slideable in a bore 60 formed in the surrounding core part 58. This results in the condition shown in FIG. 13, in which the end face of the central core part 61 is flush with the end face 62 of the surrounding core part, in which the mould 50 is closed, and in which the first moulding cavity 19 and closure cavity 20 are defined between the first mould part 51 and second mould part 52.

It is noted that instead of—or in addition to—pushing the central core part 58 back into the surrounding core part 59, the central core part 58 might also be withdrawn actively into the surrounding core part 59 up to the end face 61 of the central core part 58 is flush with the end face 62 of the surrounding core part 59.

Figure 13:
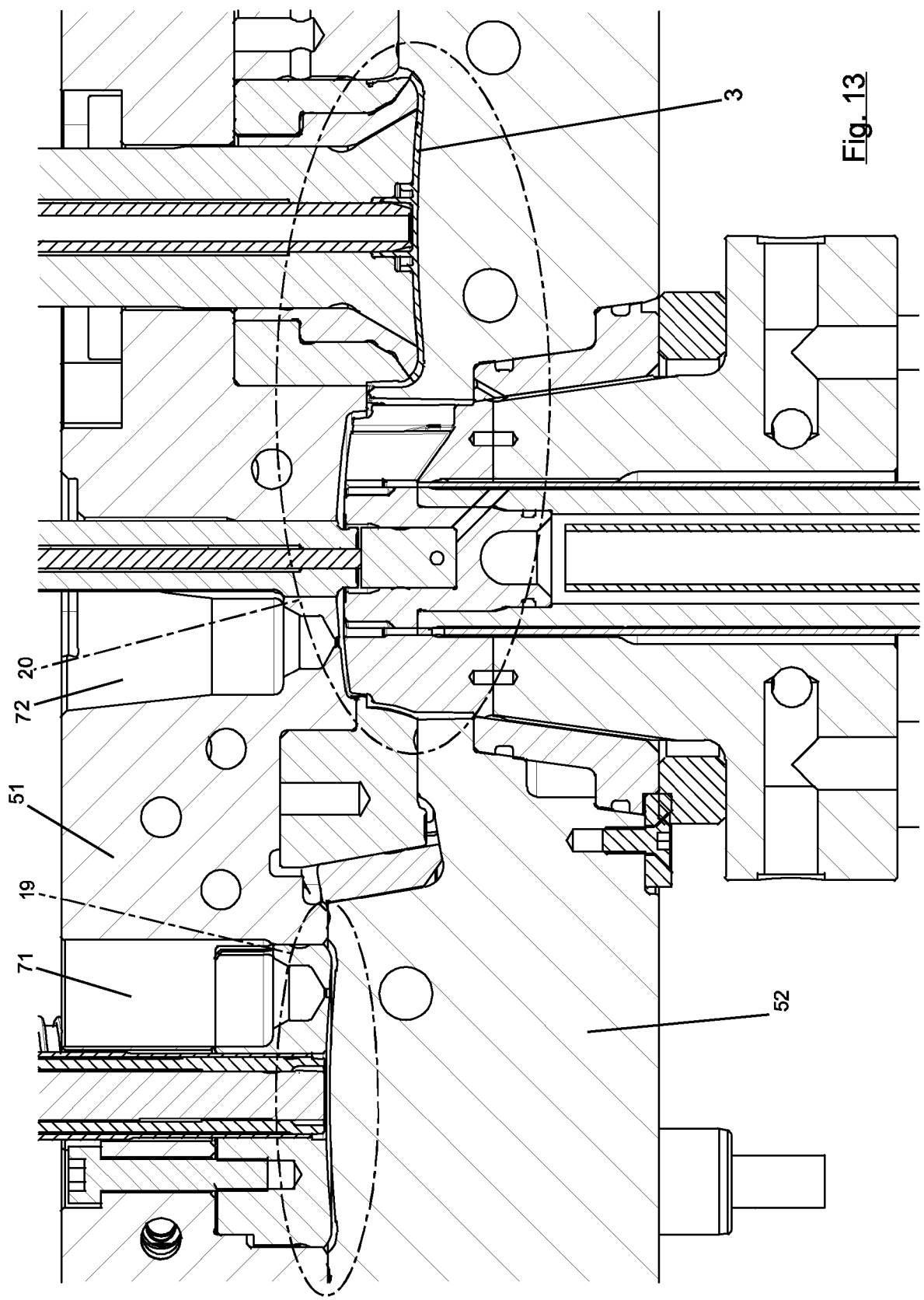

In the condition ad shown in FIG. 13, first material in injected via nozzle 71 into the first moulding cavity 19 and second material is injected via nozzle 72 into the closure cavity. The first material injected into the first moulding cavity forms a next body 3 with nipple 4 to be used in a subsequent moulding cycle. The second material injected into the closure cavity forms the closure assembly in which the body 3 with nipple 4 is integrally incorporated. The lid 2 and cap 5 are integrally connected by a hinge 7 integrally formed with the second material, in this case integrally formed with and by the second material.

It is noted that the injection of the first and second material preferably takes place simultaneously, but that it is also conceivable to inject firstly the first material and secondly the second material or the other way around, firstly the second material and secondly the first material.

Figure 14:
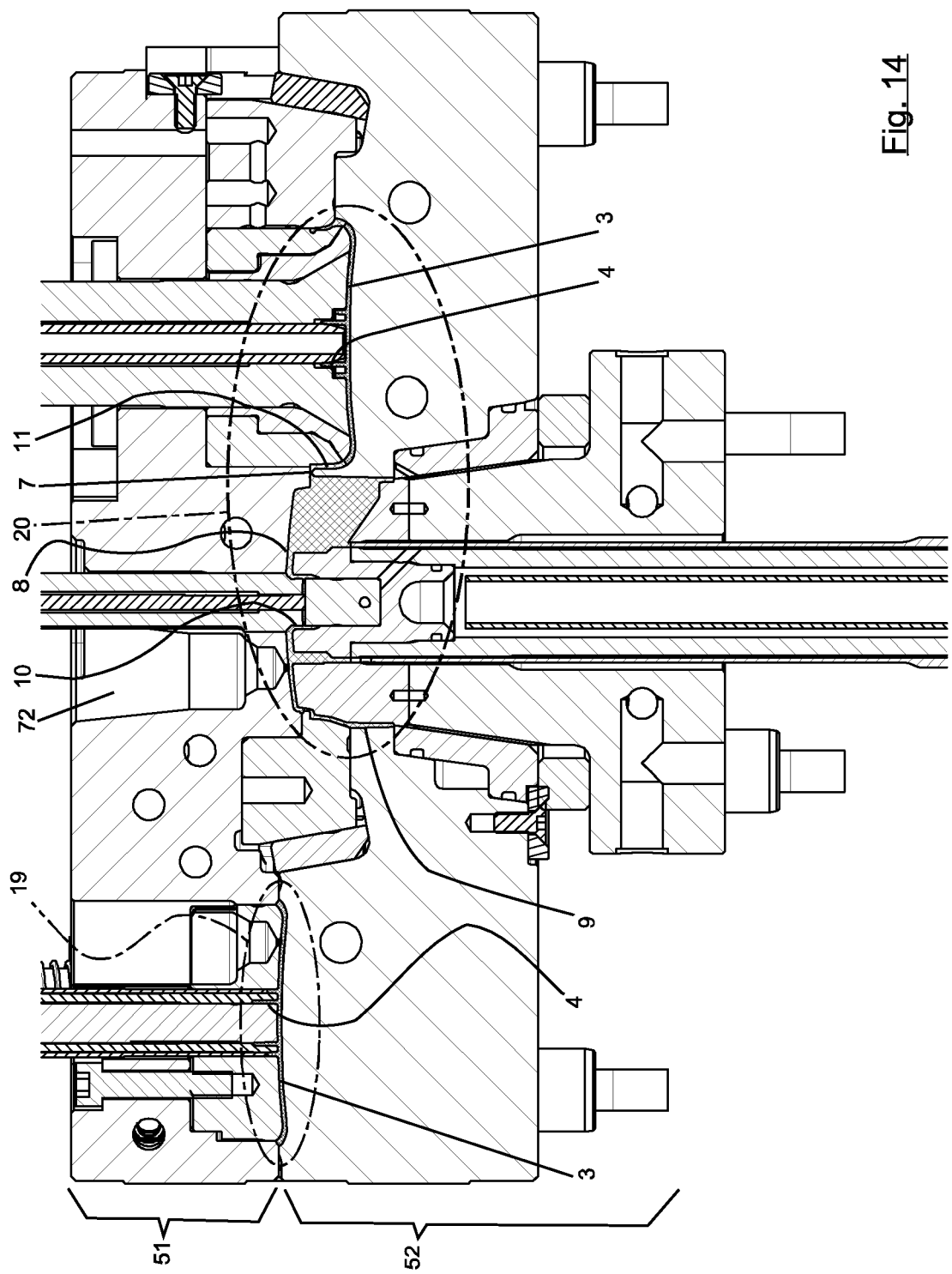

After filling the first mould cavity 19 with the first material and filling the closure cavity 20 with the second material, the condition shown in FIG. 14 results. Note that this FIG. 14 shows the same condition as the earlier discussed FIG. 7.

Figure 15:
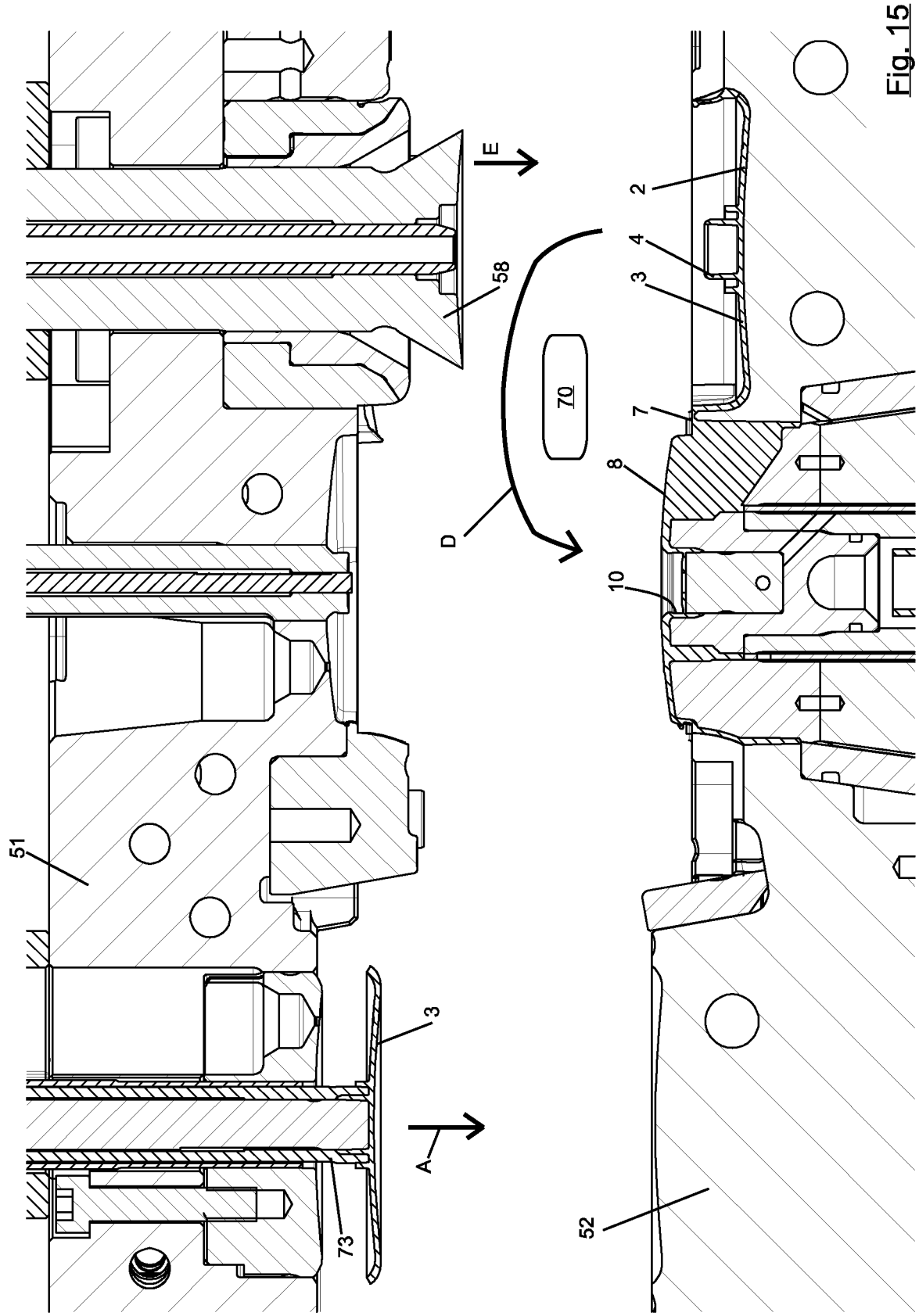
FIG. 15 showing a seventh step of the moulding cycle.

Next, the mould 50 is opened, resulting in the condition as shown in FIG. 15. Simultaneously with or after opening of the mould 50, the central core part 58 is—as indicated with arrow E—moved to project with respect to the surrounding core part 59. The central core part 58 being projected from the first mould part 51 assists in the lid 2 remaining in the body recess 74, which in turn prevents the moulded closure assembly from being released from the mould to early. In order to allow a reliable release of the lid 2 from the first mould part 51, the channel 76 of the tube part 63 might be pressurized with a gas. Also this contributes in preventing the moulded closure assembly from being released to early from the mould 50.

Also simultaneously with or after opening the mould 50, the ejector 73 is—as indicated with arrow A—moved to project with respect to the first mould part 51.

In the condition as shown in FIG. 15, a lid manipulator 70 flips—as indicated with arrow D—the lid 2 from the open position to the closed position. This results in the condition as shown in FIG. 16.

Next ejector 75 is moved to project from the second mould part 52 in order to release the moulded closure assembly 1 in a closed condition. Subsequently or simultaneously, the relocation gripper 69 might be introduced between the first mould part 51 and second mould part 52 to pick up the body 3 from the ejector 73 and to transfer this body 3 to the central core part, i.e. starting a next moulding cycle as from the condition shown in FIG. 10.

| | List of reference numbers |
|---|---|
| 1 | closure assembly |
| 2 | lid |
| 3 | body of lid |
| 4 | nipple |
| 5 | cap |
| 6 | neck |
| 7 | hinge |
| 8 | top wall of cap |
| 9 | peripheral skirt of cap |
| 10 | dispensing passage |
| 11 | skirt of lid |
| 12a | first part of locking mechanism |
| 12b | second part of locking mechanism |
| 13 | inner face of body |
| 14 | outer face of body |
| 15 | top part of lid |
| 19 | first mould cavity |
| 20 | closure cavity |
| 21 | body cavity |
| 22 | nipple cavity |
| 23 | nipple recess |
| 24 | body location |
| 25 | cavity for first part of moulding mechanism |
| 26 | cavity for skirt of lid |
| 27 | cavity for hinge |
| 28 | cavity for top wall of cap |
| 29 | cavity for dispensing passage |
| 30 | cavity for peripheral skirt of cap |
| 31 | cavity for second part of locking mechanism |
| 32 | bottom of nipple recess |
| 33 | sidewall of nipple recess |
| 50 | mould |
| 51 | first mould part |

-continued

| | List of reference numbers |
|---|---|
| 52 | second mould part |
| 53 | first mould face |
| 54 | second mould face |
| 55 | holder |
| 56 | core |
| 57 | end face of core |
| 58 | central core part |
| 59 | surrounding core part |
| 60 | bore in surrounding core part |
| 61 | end face of central core part |
| 62 | end face of surrounding core part |
| 63 | tube part |
| 64 | first, open tube end |
| 65 | second tube end |
| 66 | connection port |
| 67 | suction and/or pressure source |
| 68 | guiding surface of tube part |
| 69 | relocate gripper |
| 70 | lid manipulator |
| 71 | first nozzle |
| 72 | second nozzle |
| 73 | ejector |
| 74 | body recess |
| 75 | ejector |
| 76 | channel of tube part |

The invention claimed is:

1. A mould for injection moulding a closure assembly, in which the closure assembly is of the type having:
   a lid comprising a body moulded from a first material and provided with a tubular closing nipple projecting from an inner face of the body and moulded integrally with the body;
   a cap moulded from a second material and adapted to be attached onto a neck of a product container, the cap being integrally with and pivotably connected to the lid via a hinge, the cap having a top wall and a peripheral skirt, the top wall comprising a dispensing passage;
   the lid being pivotable with respect to the cap between an open position and a closed position in which the tubular closing nipple is sealingly received within the dispensing passage; and
   the body being a pre-moulded body, pre-moulded in a first step separate from and preceding a second moulding step;
   in which the mould comprises a first mould part and a second mould part, the first and second mould parts being movable with respect to each other between a closed position and an open position, wherein, in the closed position a first mould face of the first mould part and a second mould face of the second mould part engage each other to define together a closure cavity for moulding the closure assembly, and wherein, in the open position, the first and second mould face are separated from each other to expose the closure cavity for releasing a moulded closure assembly from the mould and placing said pre-moulded body in the closure cavity;
   in which the mould comprises a holder adapted for receiving said pre-moulded body when the mould is in the open position, and
   holding said pre-moulded body within the closure cavity when the mould is in the closed position and receiving the second material for moulding the closure assembly;

in which the holder comprises:
  a core having an end face, the end face being adapted to engage with the inner face of said pre-moulded body, and
    provided with a recess for receiving said tubular closing nipple, the recess having a bottom and a side wall extending from the bottom to the end face, and
  a tube part projecting from the bottom of the recess and adapted to be received within the tubular closing nipple, the tube part having a first tube end and second tube end, the first tube end being open and facing away from the bottom of the recess;
wherein the second tube end is in fluid connection with a connection port connectable to a suction source.

2. The mould according to claim 1,
in which the recess has recess dimensions defined by the side wall of the recess; and
in which the recess dimensions are oversized with respect to transverse dimensions of the tubular closing nipple transverse to the direction in which the tubular closing nipple projects from the inner face of the pre-moulded body.

3. The mould according to claim 2,
in which the oversize of the recess dimensions with respect to the transverse dimensions of the tubular closing nipple is at least 0.01 mm.

4. The mould according to claim 2,
in which the depth of the recess is larger than the length of the tubular closing nipple.

5. The mould according to claim 4,
in which the depth of the recess is at least 0.5 mm larger than the length of the tubular closing nipple.

6. The mould according to claim 1,
in which the tube part is, at its outside, provided with a guiding surface narrowing in the direction of the first tube end and extending up to the first tube end.

7. The mould according to claim 1,
in which the tube part has over at least part of its length, viewed in its circumferential direction, an outer dimension which mates, viewed in circumferential direction of the tubular closing nipple, an inner dimension of the tubular closing nipple.

8. The mould according to claim 1,
in which the holder is mounted in the first mould part; and
in which the tube part is moveable in its lengthwise direction with respect to the first mould part.

9. The mould according to claim 8,
in which at least a part of the core is, with respect to the first mould part, moveable in a direction transverse to the end face of the core.

10. The mould according to claim 8,
in which the tube part is fixed relative to the moveable part of the core.

11. The mould according to claim 1,
in which the core comprises a central core part and a surrounding core part having a bore slidably receiving the central core part to allow the central core part to move between an extended position and retracted position, wherein in the extended position the central core part projects from the surrounding core part and wherein in the retracted position the end face of the central core part is flush with the end face of the surrounding core part; and
in which the recess is provided in the end face of the central core part.

12. The mould according to claim 1,
in which, in the closed position of the mould, the first mould part and second mould part further define together with a body cavity for moulding said pre-moulded body;
or
in which a third mould part defines together with the first mould part or second mould part, in the closed position of the mould, a body cavity for moulding said pre-moulded body.

13. The mould according to claim 1,
in which the first mould part forms the hot side of the mould and the second mould part forms the cold side of the mould;
or
in which the first mould part forms the cold side of the mould and the second mould part forms the hot side of the mould.

14. The mould according to claim 1,
in which the mould is provided with a plurality of closure cavities, each closure cavity being provided with said holder.

15. The mould according to claim 14,
in which the mould is provided with a plurality of body cavities; and
in which a number of body cavities is the same as a number of closure cavities.

16. The mould according to claim 15,
in which the mould is a stack mould having a first stack and a second stack, and
in which the plurality of closure cavities is arranged in the first stack and the plurality of body cavities in the second stack.

17. A mould assembly comprising:
a mould according to claim 1; and
a suction source connected to the connection port.

18. The mould assembly according to claim 17, further comprising a pressure source connected to the connection port.

19. The mould assembly according to claim 18, wherein a three-way-valve is provided which can be switched between a suction position in which the connection port is connected to the suction source and a pressure position in which the connection port is connected to the pressure source.

20. The mould assembly according to claim 17, further comprising a gripper adapted to pick up one or more bodies and to deliver the one or more bodies each onto a core with the tube part inserted into the nipple.

21. A method for making a closure assembly of the type having a lid and a cap, wherein the lid comprises a body, which is pre-moulded from a first material and provided with a tubular closing nipple projecting from an inner face of the body and moulded integrally with the body, wherein the cap is moulded from a second material and adapted to be attached onto a neck of a product container, wherein the cap is integrally with and pivotably connected to the lid via a hinge, the cap having a top wall and a peripheral skirt, the top wall comprising a dispensing passage, wherein the lid is pivotable with respect to the cap between an open position and a closed position in which the tubular closing nipple is sealingly received within the dispensing passage;
the method comprising the following steps:
pre-moulding said body to obtain a pre-moulded body of the first material;
providing said mould according to claim 1;
inserting the tube part of said mould into the tubular closing nipple of the pre-moulded body;

placing the pre-moulded body on the core of said mould;
subsequently closing the mould;
subsequently moulding the closure assembly by injecting into the closure cavity a second material; and
opening the mould and removing the moulded closure assembly from the mould.

22. The method according to claim 21, wherein the step of pre-moulding the pre-moulded body comprises injecting the first material into said body cavity formed in the mould; and wherein the method further comprises the steps of:
picking up said pre-moulded body from a body cavity;
transferring the body picked up to said closure cavity.

\* \* \* \* \*